United States Patent [19]
Abe

[11] Patent Number: 5,708,509
[45] Date of Patent: Jan. 13, 1998

[54] DIGITAL DATA PROCESSING DEVICE

[75] Inventor: Nobuaki Abe, Sapporo, Japan

[73] Assignee: Asahi Kogaku Kogyo Kabushiki Kaisha, Tokyo, Japan

[21] Appl. No.: 337,409

[22] Filed: Nov. 8, 1994

[30] Foreign Application Priority Data

Nov. 9, 1993 [JP] Japan .................................. 5-303560
Nov. 15, 1993 [JP] Japan .................................. 5-308727

[51] Int. Cl.$^6$ .............................. H04N 1/41; H04N 1/46
[52] U.S. Cl. ..................... 358/426; 358/430; 358/539; 382/232; 382/248; 382/251
[58] Field of Search ........................ 358/426, 432, 358/433, 261.2, 261.3, 430, 500, 539; 382/232, 239, 248, 250, 251; 348/403, 404, 405

[56] References Cited

U.S. PATENT DOCUMENTS

| | | | |
|---|---|---|---|
| 5,384,849 | 1/1995 | Jeong | 358/433 |
| 5,396,567 | 3/1995 | Jass | 358/433 |
| 5,410,351 | 4/1995 | Kojima | 348/405 |
| 5,412,484 | 5/1995 | Yoshikawa | 358/433 |

*Primary Examiner*—Thomas D. Lee
*Attorney, Agent, or Firm*—Greenblum & Bernstein P.L.C.

[57] ABSTRACT

A digital data processing device has a DCT processing circuit in which image data is discrete cosine transformed, so that DCT coefficients can be obtained. The DCT coefficients are quantized using a quantization table in a quantization processing circuit to obtain quantized DCT coefficients. The quantized DCT coefficients are inversely quantized by the quantization table in an inverse quantization processing circuit to obtain inversely quantized coefficients. Optimum quantization coefficients are obtained by determining a minimum value for the sum of the squares of differences between the DCT coefficients and corresponding inversely quantized coefficients. The image data are then encoded using a Huffman encoding processing circuit. The encoded image data and the optimum quantization coefficients are then recorded to a recording medium.

21 Claims, 11 Drawing Sheets

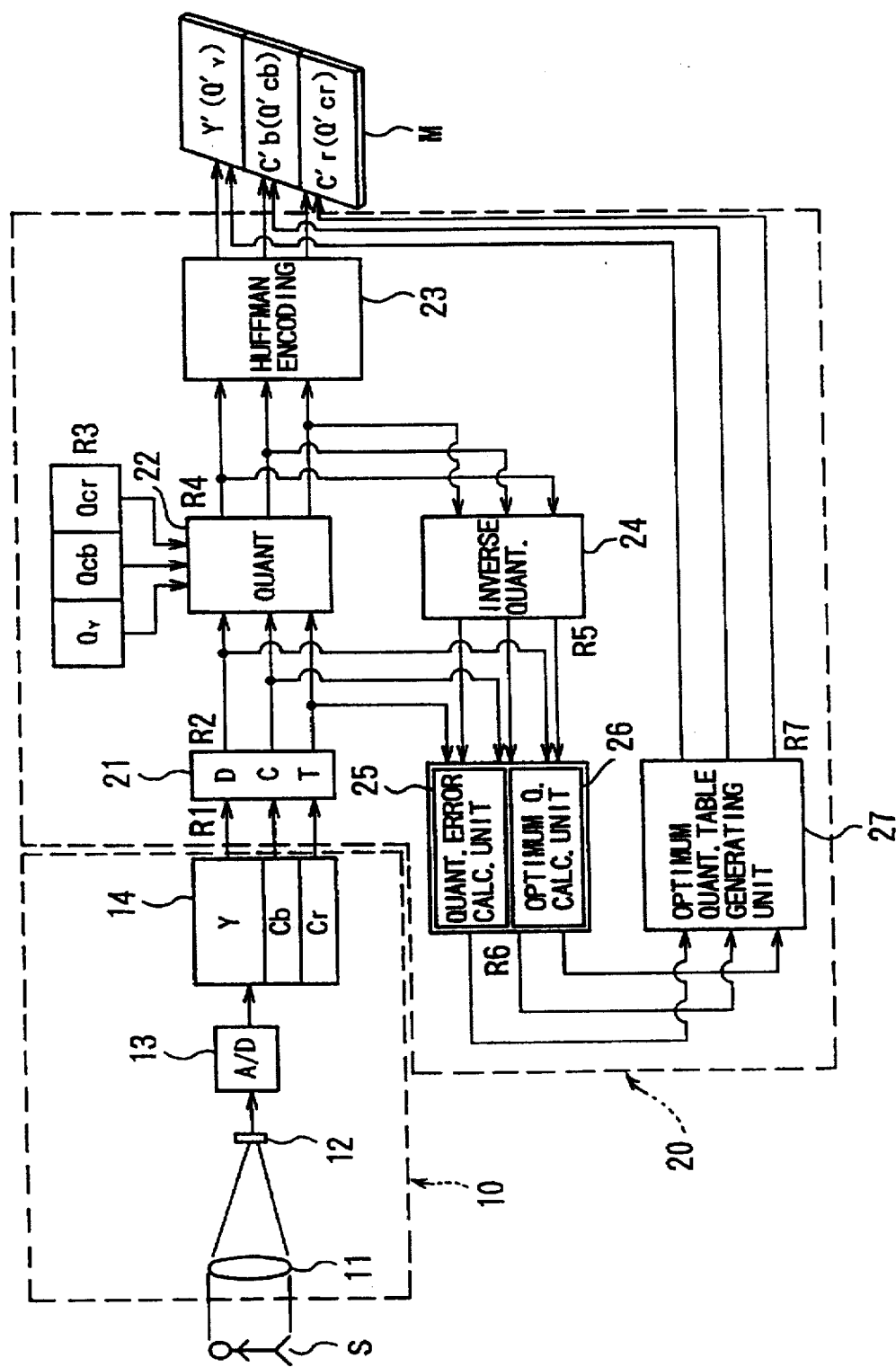

Fig. 2

8x8 PIXEL BLOCK

$$\begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{bmatrix}_{Pxy} \leftarrow R1$$

⇩ DCT

DCT COEFFICIENTS

$$\begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix}_{Suv} \leftarrow R2$$

QUANTIZATION TABLE

$$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}_{Quv}$$

QUANTIZATION ← R3

QUANTIZED DCT COEFFICIENTS

$$\begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}_{ruv} \leftarrow R4$$

Fig. 3

INVERSELY QUANTIZED DCT COEFFICIENTS

$$\begin{bmatrix} 256 & 44 & -20 & 0 & 0 & 0 & 0 & 0 \\ -84 & 36 & 0 & 0 & 0 & 0 & 0 & 0 \\ 0 & -13 & 0 & 0 & 0 & 0 & 0 & 0 \\ -14 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \begin{matrix} \\ \\ \\ \leftarrow R5 \\ \\ \\ \\ \\ S'uv \end{matrix}$$

DCT COEFFICIENTS

$$\begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix} \begin{matrix} \\ \\ \\ \\ \\ \\ \\ \\ Suv \end{matrix}$$

R2

DCT QUANTIZATION ERRORS

$$\begin{bmatrix} -4 & -5 & -4 & -5 & -2 & -4 & 0 & -1 \\ -5 & 0 & 2 & 7 & -1 & 3 & 1 & 2 \\ 0 & -5 & -3 & 2 & 2 & -1 & -5 & -1 \\ -6 & 4 & -5 & 4 & -1 & -7 & -6 & 2 \\ 2 & 6 & 1 & 0 & 4 & 1 & 0 & 1 \\ 3 & 2 & 1 & 1 & -1 & -2 & 5 & 1 \\ 4 & 1 & -1 & 0 & 0 & 2 & -2 & 0 \\ -1 & -1 & -1 & -1 & 1 & -1 & 0 & 0 \end{bmatrix} \begin{matrix} \\ \\ \\ \leftarrow R6 \\ \\ \\ \\ \\ Duv=S'uv-Suv \end{matrix}$$

OPTIMUM QUANTIZATION TABLE

$$\begin{bmatrix} 16 & ⑫ & ⑧ & 16 & 24 & 40 & 51 & 61 \\ ⑪ & 12 & 14 & 19 & 26 & 58 & 60 & 55 \\ 14 & ⑧ & 16 & 24 & 40 & 57 & 69 & 56 \\ ⑧ & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix} \begin{matrix} \\ \\ \\ \leftarrow R7 \\ \\ \\ \\ \\ Q'uv \end{matrix}$$

Fig. 4

OPTIMUM INVERSE QUANTIZED DCT COEFFICIENTS

$$\begin{bmatrix} 256 & 48 & -16 & 0 & 0 & 0 & 0 & 0 \\ -77 & 36 & 0 & 0 & 0 & 0 & 0 & 0 \\ 0 & -8 & 0 & 0 & 0 & 0 & 0 & 0 \\ -8 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \leftarrow R8$$

DCT COEFFICIENTS

$$\begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix} Suv$$

R2

OPTIMUM DCT QUANTIZATION ERRORS

$$\begin{bmatrix} -4 & -1 & 0 & -5 & -2 & -4 & 0 & -1 \\ 2 & 0 & 2 & 7 & -1 & 3 & 1 & 2 \\ 0 & 0 & -3 & 2 & 2 & -1 & -5 & -1 \\ 0 & 4 & -5 & 4 & -1 & -7 & -6 & 2 \\ 2 & 6 & 1 & 0 & 4 & 1 & 0 & 1 \\ 3 & 2 & 1 & 1 & -1 & -2 & 5 & 1 \\ 4 & 1 & -1 & 0 & 0 & 2 & -2 & 0 \\ -1 & -1 & -1 & -1 & 1 & -1 & 0 & 0 \end{bmatrix} \leftarrow R9$$

Fig. 6

INVERSELY QUANTIZED
DCT COEFFICIENTS $$\begin{bmatrix} 256 & 44 & -20 & 0 & 0 & 0 & 0 & 0 \\ -84 & 36 & 0 & 0 & 0 & 0 & 0 & 0 \\ 0 & -13 & 0 & 0 & 0 & 0 & 0 & 0 \\ -14 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \begin{matrix} \leftarrow R5 \\ \\ \\ \\ \\ \\ \\ S'uv \end{matrix}$$

DCT COEFFICIENTS $$\begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix} Suv$$

R2

DCT QUANTIZATION ERRORS $$\begin{bmatrix} -4 & -5 & -4 & -5 & -2 & -4 & 0 & -1 \\ -5 & 0 & 2 & 7 & -1 & 3 & 1 & 2 \\ 0 & -5 & -3 & 2 & 2 & -1 & -5 & -1 \\ -6 & 4 & -5 & 4 & -1 & -7 & -6 & 2 \\ 2 & 6 & 1 & 0 & 4 & 1 & 0 & 1 \\ 3 & 2 & 1 & 1 & -1 & -2 & 5 & 1 \\ 4 & 1 & -1 & 0 & 0 & 2 & -2 & 0 \\ -1 & -1 & -1 & -1 & 1 & -1 & 0 & 0 \end{bmatrix} \begin{matrix} \leftarrow R6 \\ \\ \\ \\ \\ \\ \\ D'uv = S'uv - Suv \end{matrix}$$

OPTIMUM QUANTIZATION TABLE $$\begin{bmatrix} ⑬ & ⑦ & ④ & 16 & 24 & 40 & 51 & 61 \\ ⑩ & ⑭ & 14 & 19 & 26 & 58 & 60 & 55 \\ 14 & ⑭ & 16 & 24 & 40 & 57 & 69 & 56 \\ ⑰ & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix} \begin{matrix} \leftarrow R7 \\ \\ \\ \\ \\ \\ \\ Q'uv \end{matrix}$$

Fig. 8

| GROUP NUMBER | DCT COEF. (DIFF. VALUE) | MIN. COEF. | MAX. COEF. |
|---|---|---|---|
| 0 | 0 | 0 | 0 |
| 1 | -1, 1 | -1, 1 | -1, 1 |
| 2 | -3, -2, 2, 3 | -2, 2 | -3, 3 |
| 3 | -7..-4, 4..7 | -4, 4 | -7, 7 |
| 4 | -15..-8, 8..15 | -8, 8 | -15, 15 |
| 5 | -31..-16, 16..31 | -16, 16 | -31, 31 |
| 6 | -63..-32, 32..63 | -32, 32 | -63, 63 |
| 7 | -127..-64, 64..127 | -64, 64 | -127, 127 |
| 8 | -255..-128, 128..255 | -128, 128 | -255, 255 |
| 9 | -511..-256, 256..511 | -256, 256 | -511, 511 |
| 10 | -1023..-512, 512..1023 | -512, 512 | -1023, 1023 |
| 11 | -2047..-1024, 1024..2047 | -1024, 1024 | -2047, 2047 |

Fig. 9

| r uv | r' uv | C uv | c' uv | MAX. COEF. | r" uv |
|---|---|---|---|---|---|
| (-20) 16 | (-16) 20 | 5 | 5 | (-31) 31 | (-16) 20 |
| 4 | 7 | 3 | 3 | 7 | 7 |
| -2 | -4 | 2 | 3 | -3 | -3 |
| -7 | -8 | 3 | 4 | -7 | -7 |
| 3 | 3 | 2 | 2 | 3 | 3 |
| -1 | -1 | 1 | 1 | -1 | -1 |
| -1 | 0 | 1 | 0 | -1 | 0 |

Fig. 11

| r uv | r' uv | C uv | c' uv | MAX. COEF. | MIN. COEF. | r" uv |
|---|---|---|---|---|---|---|
| (-20) 16 | (-16) 20 | 5 | 5 | (-31) 31 | (-16) 16 | (-16) 20 |
| 4 | 7 | 3 | 3 | 7 | 4 | 7 |
| -2 | -4 | 2 | 3 | -3 | -2 | -3 |
| -7 | -8 | 3 | 4 | -7 | -4 | -7 |
| 3 | 3 | 2 | 2 | 3 | 2 | 3 |
| -1 | -1 | 1 | 1 | -1 | -1 | -1 |
| -1 | 0 | 1 | 0 | -1 | -1 | -1 |

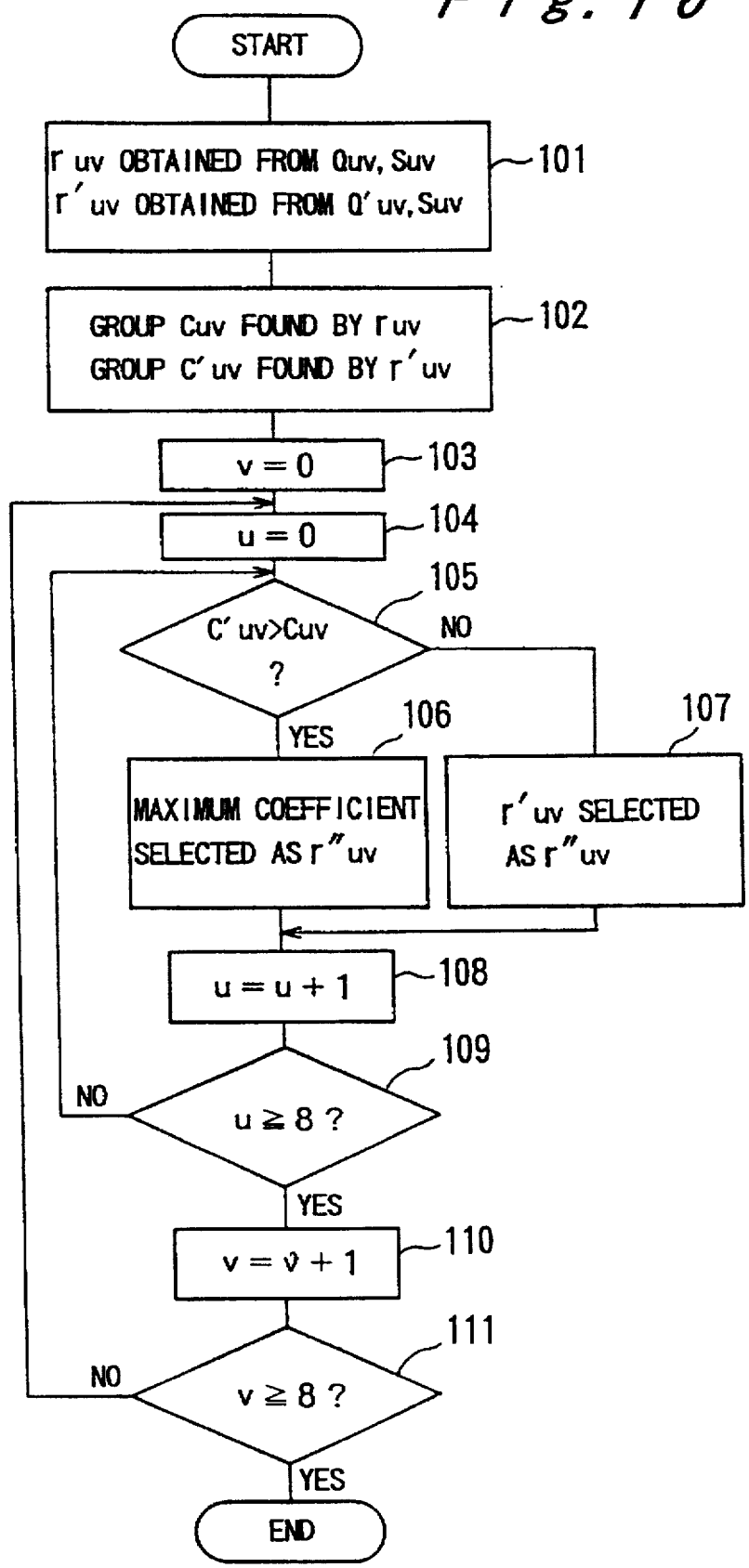

DIGITAL DATA PROCESSING DEVICE

BACKGROUND OF THE INVENTION

1. Field of the Invention

The present invention relates to a digital data processing device provided in a device in which a color still image, for example, is recorded on a recording medium or reproduced from the recording medium according to JPEG algorithm.

2. Description of the Related Art

Generally, image data contains a large quantity of imformation. Therefore, if the image data are processed directly, a large volume of memory is needed and time required for data transfer is too long. Accordingly, in a conventional image recording-processing device, image data is encoded and compressed, and then subjected to a predetermined process and recorded.

Among the algorithms available for image data compression, there is known one recommended by the JPEG (Joint Photographic Expert Group). This algorithm (i.e., the JPEG algorithm) is composed of a plurality of processes such as a Base Line Process, by which an original 8-bit image is encoded using a discrete cosine transformation (i.e., a DCT process) and a Huffman encoding process so that the image information can be electronically transmitted, received and reproduced.

In the Base Line Process, pixel data for each block forming one frame are DCT-tranformed to obtain DCT coefficients and the DCT coefficients are subjected to quantization using a quantization table. Namely, the DCT coefficients are quantized by dividing by quantization coefficients from the quantization table. The quantized DCT coefficients are Huffman-encoded and recorded, on a recording medium for examples as compressed image data.

Due to such a data compressions some of the information in the original image is lost. Therefore, the image quality of the reproduced image is lower than that of the original image.

SUMMARY OF THE INVENTION

Accordingly an object of the present invention is to provide a digital data processing device which can improve the image quality of a reproduced image.

According to the present inventions a digital data processing device comprising first quantizer inverse quantizer and generator is provided. The first quantizer quantizes the input data, to obtain first quantized data, by using a first quantization table containing a plurality of first quantization coefficients. The inverse quantizer inversely quantizes the first quantized data to obtain inversely quantized data. The generator generates a second quantization table containing a plurality of second quantization coefficients which are obtained in such a manner that the inversely quantized data have values closer to the input data in comparison with the case in which the first quantization table is used.

According to another aspect of the present invention, a digital data processing device including first quantizer, second quantizer, classifier and changer is also provided. The first quantizer quantizes input data to obtain first quantized data using a first quantization table containing a plurality of first quantization coefficients. The second quantizer quantizes input data to obtain second quantized data using a second quantization table containing a plurality of second quantization coefficients having values different from the first quantization coefficients. The classifier classifies each coefficient included in the first and second quantized data in accordance with the data length of each coefficient. The changer changes the second quantized data in such a manner that a group to which coefficients of the second quantized data belong does not have a data length longer than that of a group to which coefficients of the first quantized data belong.

BRIEF DESCRIPTION OF THE DRAWINGS

The present invention will be better understood from the description of the preferred embodiments of the invention, as set forth below, together with the accompanying drawings in which:

FIG. 1 is a block diagram of a still video camera having a digital data processing device of a first embodiment of the present invention;

FIG. 2 is a view of an example of image data, DCT coefficients, a quantization table and quantized DCT coefficients;

FIG. 3 is a view of an example of inversely quantized DCT coeffients, DCT quantization errors and an optimum quantization table;

FIG. 4 is a view of an example of optimum inverse quantization DCT coeffients and optimum DCT quantization errors;

FIG. 6 is a view of an example of inversely quantized DCT coeffients, DCT quantization errors and an optimum quantization table in the second embodiment;

FIG. 8 is a classification table for DC components;

FIG. 9 is a table showing data having a value other than "0", among $r_{uv}$, $r'_{uv}$, $C_{uv}$, $C'_{uv}$ and $r''_{uv}$, in the second embodiment;

FIG. 10 is a flow chart of a program for obtaining the changed quantized DCT coefficients in the second embodiment;

FIG. 11 is a table showing data having a value other than "0", among $r_{uv}$, $r'_{uv}$, $C_{uv}$, $C'_{uv}$ and $r''_{uv}$, in a third embodiment.

DESCRIPTION OF THE PREFERRED EMBODIMENTS

Figure 5:
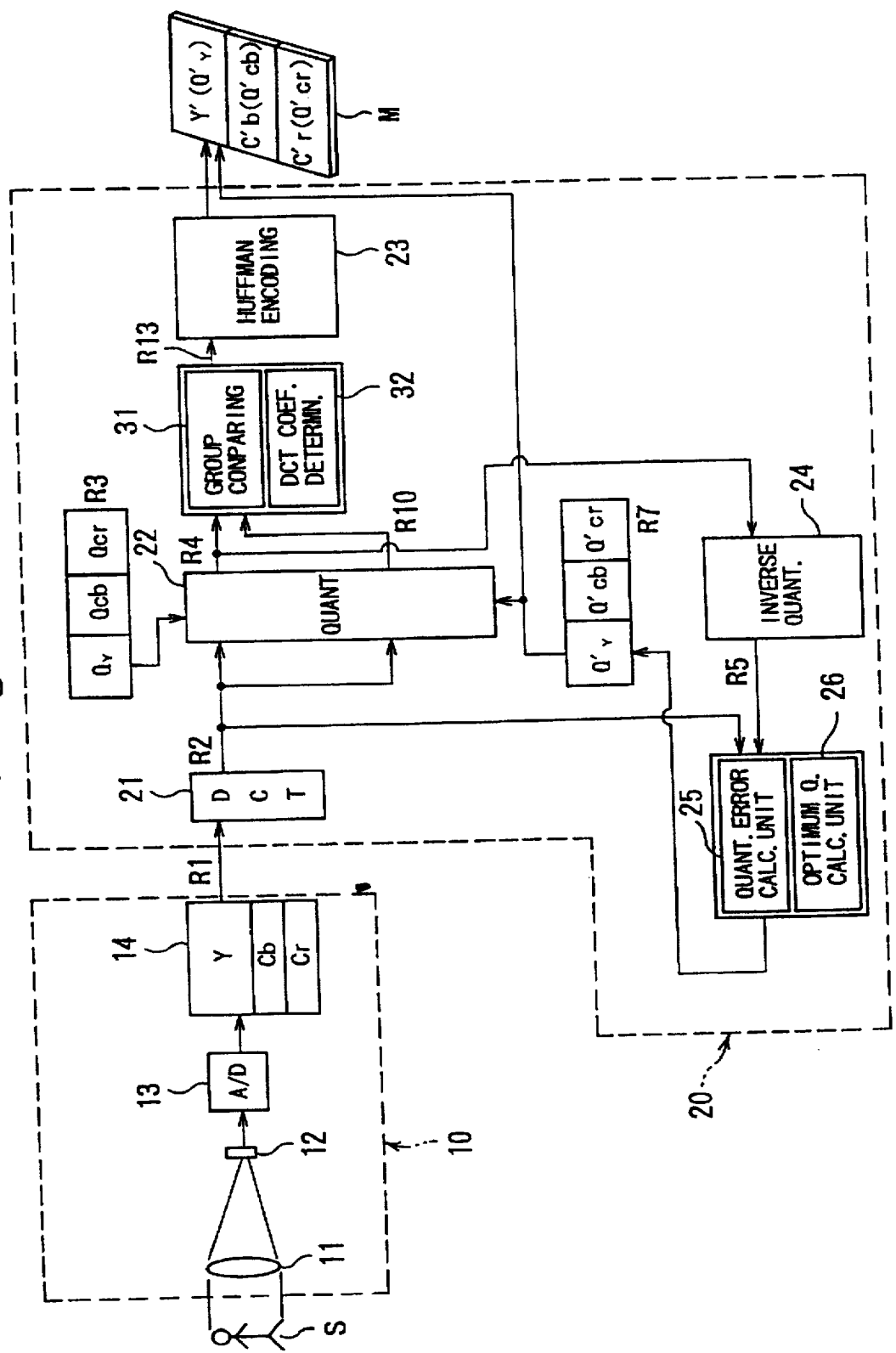
FIG. 5 is a block diagram of a still video camera having a digital data processing device of a second embodiment of the present invention.

The present invention will be described below with reference to the embodiments shown in the drawings.

FIG. 1 is a block diagram of a still video camera having a digital data processing device of a first embodiment of the present invention.

An image signal of a subject S obtained by an image capture unit 10 is transmitted to an image compression device 20, in which the image signal is subjected to a data compression process, and is then recorded on a recording medium M, such as an IC card. In addition to the compressed image signal, a quantization table to be used in the reproduction of the image signal, is also recorded in the recording medium M.

In the image capture unit 10, light coming from the subject S is focussed by a condenser lens 11 and an image of the subject is formed on a light receiving surface of a CCD (charge coupled device) 12. On the light receiving surface of the CCD 12 are disposed a large number of photoelectric conversion elements. Further, on top of the photoelectric conversion elements are provided, for example, color filters comprised of R, G, and B color filter elements which are arranged according to a predetermined method. Each of these photoelectric conversion elements corresponds to a single pixel of data. The subject image is converted into electrical signals corresponding to predetermined colors by the photoelectrical conversion elements and these signals are then inputted to an A/D converter 13.

The signals are converted from an analog to digital format in the A/D converter 13, and converted into a luminance signal Y and differential color signals Cb and Cr by a signal processing circuit, not shown, and are then inputted to an image memory 14. The image memory 14 is divided into mutually independent memory areas for storing the luminance signal Y and the differential color signals Cb and Cr separately. Each memory area contains one frame's worth of storage. The luminance signal Y and the differential color signals Cb and Cr stored in the image memory 14 are inputted to a DCT processing circuit 21 in the image compression device 20 and undergo a data compression process. Note that, although only one DCT processing circuit 21 is shown in FIG. 1, separate DCT processing circuits are and actually provided for the luminance signal Y and the differential color signals Cr.

In the image compression device 20, each frame's worth of image data, such as the luminance signal Y, are divided into 8×8 blocks and are processed in units of blocks. As shown in FIG. 2, each pixel block R1 is composed of 8×8 pixels of data containing, for example, the luminance signal Y. Note that, when one frame is composed of 768×480 pixels, for example, the total number of blocks is 9×60=5760 blocks.

In the DCT processing circuit 21, the image data (pixel data) of the original image is subjected to a two-dimensional DCT, and thus, 8×8 DCT coefficients R2 (image processing data) are obtained for one block. In the matrix of the DCT coefficients R2, (see FIG. 2) the DCT coefficient (260) at the top-left corner is a DC (Direct Current) component, while the remaining 63 DCT coefficients are AC (Alternating Current) components. In the AC components, a component has a higher horizontal spatial frequency as the component is positioned closer to the right, and a component has a higher vertical spatial frequency as the component is positioned closer to the bottom. The DC component shows the average value of the spatial frequency component of the 8×8 pixel block as a whole.

The DCT coefficients R2 outputted from the DCT circuit 21 are quantized by a quantization table $(Q_y, Q_{cb}, Q_{cr})$ R3 in a quantization processing circuit 22. The quantization table R3 is provided for each of the luminance signal Y and the differential color signals Cb and Cr, and each of the quantization tables R3 is composed of 8×8 quantization coefficients. Each component of the DCT coefficients R2 is divided by a corresponding quantization coefficient, and quantized DCT coefficients R4 are obtained. Namely, the number of the DCT coefficients R2 is the same as that of the quantization coefficients. Each of the quantized DCT coefficients R4 is rounded off to an integer value, and therefore, part of the image information is lost in the quantized DCT coefficients R4.

The quantized DCT coefficients outputted from the quantization processing circuit 22 are inputted to a Huffman encoding processing circuit 23, where they are Huffman encoded by a predetermined algorithm. The image signals (Y', Cb', and Cr') obtained from Huffman encoding processing circuit 23 are recorded in the IC memory card (recording medium) M. Since Huffman encoding is well known, a description thereof is omitted.

While being inputted to the Huffman encoding processing circuit 23, the quantized DCT coefficients R4 are inputted to an inverse quantization processing circuit 24 where they are inversely quantized. Namely, the quantized DCT coefficients R4 are multiplied by the quantization coefficients in the quantization tables $(Q_y, Q_{cb}, Q_{cr})$ R3 in the inverse quantization processing circuit 24, whereby inversely quantized DCT coefficients R5 are obtained as shown in FIG. 3. Each of the inversely quantized DCT coefficients R5 is exactly equal to the corresponding DCT coefficients R2 if none of the image information is lost when generating the quantized DCT coefficients R4. However, since part of the image information is lost as described above, each of the inversely quantized DCT coefficients R5 is not exactly the same as the corresponding DCT coefficients R2, and therefore, the image quality of the reproduced image is reduced in comparison with the original image. In this embodiment, as described below, the difference between the inversely quantized DCT coefficients R5 and the DCT coefficients R2, i.e., the DCT quantization error is reduced as much as possible, and the image quality of the reproduced image is improved.

The inversely quantized DCT coefficients R5 and the DCT coefficients R2 outputted from the DCT processing circuit 21 are inputted to a quantization error calculation unit 25 to compute differences betwen the coefficients R5 and R2, that is, DCT quantization errors R6. In an optimum quantization coefficient calculating unit 26, an optimum quantization table R7 is generated using the DCT quantization errors R6, as described below.

It is supposed that the matrix of the quantization table R3 is $Q_{uv}$, the matrix of the DCT coefficients R2 of the number "i" block is $S_{iuv}$, the matrix of the quantized DCT coefficients R4 is $r_{iuv}$, and the matrix of the inversely quantized DCT coefficients R5 is $S'_{iuv}$. In one frame, a sum $E_{uv}$ of square of the DCT quantization error is:

$$E_{uv} = \Sigma(S_{iuv} - S'_{iuv})^2 \quad (1)$$
$$= \Sigma(r_{iuv} \times Q_{uv} - S_{iuv})^2$$

wherein Σ means the total number of all the blocks forming one frame.

By differentiating equation (1) by $Q_{uv}$, $$dE_{uv}/dQ_{uv} = 2\Sigma r_{iuv}(r_{iuv} \times Q_{uv} - S_{iuv}) \quad (2)$$

is obtained. It is supposed that, when the square sum $E_{uv}$ has the minimum value, $Q_{uv}$ is equal to $Q'_{uv}$, which is obtained by setting equation (2) to 0 and transforming the equation. Namely, $$Q'_{uv} = round(\Sigma r_{iuv} \times S_{iuv}/\Sigma r_{iuv}^2) \quad (3)$$

wherein "round" in this equation means rounding approximation to the nearest integer.

According to equation (3), each component of the matrix of the optimum quantization table R7 is calculated. In an optimum quantization table generating unit 27, the optimum quantization table R7 is generated based on the result of the calculation. The optimum quantization table R7 is recorded together with the image signals (Y', Cb', and Cr') in the recording medium M as the quantization table ($Q_y'$, $Q_{Cb}'$, $Q_{Cr}'$). Note that the data in the optimum quantization table R7 is different from the data in the quantization table R3 where circled, as can be seen from a comparison with the quantization table of FIG. 2.

FIG. 4 shows an example of an optimum inversely quantized DCT coefficients R8, that is, the DCT coefficients obtained by inverse quantization using the optimum quantization table R7. The optimum inversely quantized DCT coefficients R8 have different values compared to the inversely quantized DCT coefficients R5 where circled, as understood from comparison with FIG. 3. In an optimum DCT quantization errors R9 which is the difference between the optimum inversely quantized DCT coefficients R8 and the DCT coefficients R2, the errors for low frequency components are closer to 0 than the DCT quantization errors R6, as can be seen from a comparison between FIG. 3 and FIG. 4.

Therefore, in a reproducing operation, if the DCT coefficients are obtained from the image signals (Y', Cb', Cr') recorded in the recording medium M using the optimum quantization table R7 (i.e., the optimum inversely quantized DCT coefficients R8 are obtained), these DCT coefficients produce data close to the DCT coefficients inputted to the quantization processing circuit 22. If the image data are calculated using the inverse DCT transformation, the image data are very close to the inputted image data (i.e., the pixel data of the pixel block R1), so that the image quality of the reproduced image is improved. Namely, the optimum quantization table R7 is obtained in such a manner that the inversely quantized DCT coefficients have values closer to the input data in comparison with a case in which the first quantization table R3 is used.

Further, in this embodiment, the quantization coefficients of the quantization table R3 used in an operation in which the image signal is recorded in the recording medium M are not changed. Therefore, the amount of data obtained by quantizing the input data (i.e., each component of the DCT coefficients R2) is the same as for a conventional device. Still further, in this embodiment, since the image data do not need to be again compressed again by a circuit such as the Huffman encoding processing circuit 23, the time required for processing the image data is short, and the operation efficiency is high.

FIG. 5 is a block diagram of a still video camera having a digital data processing device of a second embodiment of the present invention. In this drawing, a signal line extending from the image capture unit 10 to the image compression device 20, and signal lines connecting each element (e.g., the DCT 21) mounted in the image compression device 20, provided for transmitting data corresponding to the luminance signal Y are shown, and the signal lines for transmitting the differential color signals Cb and Cr are not shown.

The construction of the image capture unit 10 is the same as that of the first embodiment shown in FIG. 1. In the image compression device 202 the DCT processing circuit 212 the image processing circuit 22, the Huffman encoding processing circuit 23, the inverse quantization processing circuit 24, the quantization error calculation unit 25 and the optimum quantization coefficient calculating unit 26 have basically the same construction and operation as those of the first embodiment.

As shown in FIG. 2, the image data for an 8×8 pixel block R1 are subjected to a two-dimensional DCT, and thus, 8×8 DCT coefficients R2 are obtained. The DCT coefficients R2 are quantized by a quantization table R3 so that the quantized DCT coefficients R4 are obtained. The inversely quantized DCT coefficients R5, shown in FIG. 6 are obtained by multiplying the quantized DCT coefficients R4 with data in the quantization table R3. The inversely quantized DCT coefficients R5 and the DCT coefficients R2 are inputted to the quantization error calculation unit 25 so that the DCT quantization error R6 are obtained. In the optimum quantization coefficient calculating unit 26, the optimum quantization table R7 is generated in the same manner as described in the first embodiment. Note that some values in the optimum quantization table R7 shown in FIG. 6 are different from those of the optimum quantization table R7 shown in FIG. 3, since it is supposed that pixel data of blocks other than that corresponding to the table shown in FIG. 3 or 6 are different between the first and second embodiments.

Figure 7:
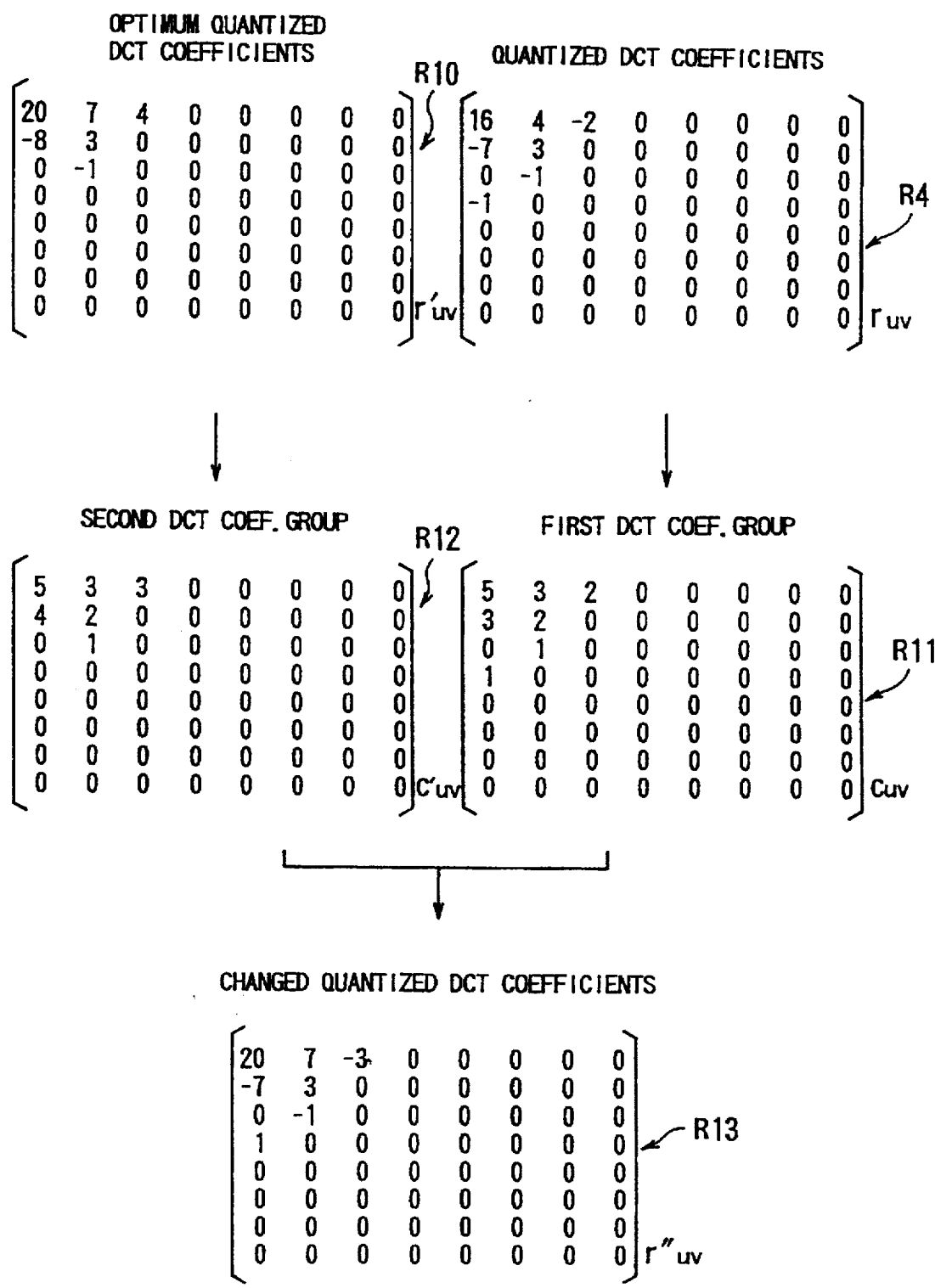
FIG. 7 is a view of an example of optimum quantization DCT coeffients, a first DCT coefficient group, a second DCT coefficient group and changed quantized DCT coefficients.

In the second embodiment, the optimum quantization table R7 is inputted to the quantization processing circuit 22. Namely, each of the DCT coefficients R2 outputted from the quantization processing circuit 21 is quantized by being divided by the corresponding quantization coefficient in the optimum quantization table R7. Each of the optimum quantization DCT coefficients R10 obtained by this quantization is rounded off to an integer, similar to the quantized DCT coefficients R4, as shown in FIG. 7.

The quantized DCT coefficients R4 and the optimum quantization DCT coefficients R10 obtained by the quantization processing circuit 22 are inputted to a group comparing unit 31, in which the quantized DCT coefficients R4 and the optimum quantization DCT coefficients R10 are classified according to a table shown in FIG. 8 as described later, and then, it is determined whether or not the corresponding components of the quantized DCT coefficients R4 and the optimum quantization DCT coefficients R10 belong to the same group. In accordance with this determination, the optimum quantized DCT coefficients R10 are adjusted or changed by a DCT coefficient determinating unit 32, and outputted to the Huffman encoding processing circuit 23 as changed quantized DCT coefficients R13.

In the Huffman encoding circuit 23, based on the group number and the run length (i.e., the number of consecutive zeros) of each coefficient, a code word is determined in accordance with a predetermined encoding table, and an additional bit corresponding to the group number is added to the code word, so that the DCT coefficients R13 are encoded to a series of binary numbers.

An operation in which the changed quantized DCT coefficients R13 are generated by the group comparing unit 31 and the DCT coefficient determinating unit 32 is described below with reference to FIGS. 7 through 10.

FIG. 8 shows a classification for DC components of the quantized DCT coefficients R4 and R10, the DC components being positioned at an upper-left corner of each matrix shown in FIG. 7, and the value is "16" in the quantized DCT coefficients R4. In FIG. 8, the quantized DCT coefficients are grouped in accordance with the data length after encoding (i.e., binary data), and the larger the group numbers the longer the data length of the DCT coefficient. The minimum coefficient is the coefficient having the smallest value among the DCT coefficients belonging to the group. The maximum coefficient is the coefficient having the biggest value among the DCT coefficients belonging to the group. Note that, regarding the AC components which are the components in positions other than the upper-left corners in FIG. 7, the group numbers are 0 through 10, there is no coeffients larger than the group number "11", and the other matters are the same as the DC components. Therefore, the classification table for the AC components is not shown.

FIG. 9 shows data, especially data having a value other than "0" among $r_{uv}$ (the quantized DCT coefficients R4), $r'_{uv}$ (the optimum quantized DCT coefficients R10), $C_{uv}$ (the first DCT coefficient group R11), $C'_{uv}$ (the second DCT coefficient group R12) and $r''_{uv}$ (the changed quantized DCT coefficients R13) shown in FIG. 7. Note that the plus and minus symbols on the maximum coefficients are coincident with the plus and minus symbols on $r'_{uv}$. Furthers the figure in parenthesis, the DC component (data in the uppermost row column), correspond to differential values described later.

FIG. 10 shows a flow chart of a program for obtaining the quantized DCT coefficients R4 and the optimum quantization DCT coefficients R10 from the DCT coefficients R2, and for obtaining the changed quantized coefficients R13 based on the DCT coefficients R4 and R10.

In Step 101, the quantized DCT coefficients R4 and the optimum quantization DCT coefficients R10 are obtained in the quantization processing circuit 22. Namely, $r_{uv}$ (the quantized DCT coefficients R4) is calculated from $S_{uv}$ (the DCT coefficients R2) by using $Q_{uv}$ (the quantization table R3), and $r'_{uv}$ (the optimum quantized DCT coefficients R10) is calculated from $S_{uv}$ (the DCT coefficients R2) by using $Q'_{uv}$ (the optimum quantization table R7). Note that, each time Step 101 is carried out, $r_{uv}$ and $r'_{uv}$ are obtained for one block composed of 8×8 pixel data.

In Step 102, group $C_{uv}$ (i.e., the first DCT coefficient group R11) is obtained from $r_{uv}$, and the group $C'_{uv}$ (i.e., the second DCT coefficient group R12) is obtained from $r'_{uv}$. The groups $C_{uv}$ and $C'_{uv}$ are found by determining what group the coefficients $r_{uv}$ and $r'_{uv}$ belong to, with reference to the table shown in FIG. 8. As in Step 101, each time Step 102 is carried out, groups $C_{uv}$ and $C'_{uv}$ are obtained for each coefficient included in the quantized DCT coefficients $r_{uv}$ and $r'_{uv}$ of one block.

Note that the method of classification in Step 102 is different for the DC component and for the AC component. Namely, the classification of groups $C_{uv}$ and $C'_{uv}$ for the DC component is performed based on a differential value between the DC component of the block which is currently being processed and the DC component of the block which was processed in the previous process. The classification of groups $C_{uv}$ and $C'_{uv}$ for the AC component is performed based on the coefficient value of the block which is currently being processed.

The process for determining the DC component for the group numbers of groups $C_{uv}$ and $C'_{uv}$ is described below. Assume that the value of the coefficient $r_{uv}$ (R4) is "16" as shown in FIG. 7 and that, for example, the DC component value of the previous DC component is "36". The differential value is "−20" (i.e., 16−36). Referring to FIG. 8, the group number for group $C_{uv}$ to which the differential value (DIFF. VALUE) "−20" belongs is "5". Similarly, since the coefficient value for $r'_{uv}$ (R10) is "20" the differential value is "−16" (i.e., 20−36) and the group number for group $C'_{uv}$ to which the differential value "−16" belongs is also "5".

The process for determining the AC component for the group numbers for groups $C_{uv}$ and $C'_{uv}$ is described below. In the example of FIG. 7, the group number, found in FIG. 8, for group $C_{uv}$ for the coefficient "4" positioned to the right of the DC component "16" in $r_{uv}$ (R4), is "3". The group number, found in FIG. 8, for group $C'_{uv}$ for coefficient "7" positioned to the right of the DC component "20" in $r'_{uv}$ (R10) is also "3". Likewise, the group number, found in FIG. 8 for group $C_{uv}$ for the coefficient "−7" positioned below the DC component "16" in $r_{uv}$ (R4) is "3". The group number, found in FIG. 8, for group $C'_{uv}$ for the coefficient "−8" positioned below the DC component "20" in $r'_{uv}$ (R10) is "4". The group numbers for groups $C_{uv}$ and $C'_{uv}$ are compiled in the table shown in FIG. 9.

Thus, after the groups $C_{uv}$ and $C'_{uv}$ are determined for all of the coefficients of one block, parameters "u" and "v" are initialized to "0" in Steps 103 and 104, respectively. Then, in Steps 105 through 111, the changed quantized DCT coefficients $r''_{uv}$ are obtained for one block. Note that parameter "u" indicates the address of each component in a horizontal row in each matrix shown in FIG. 7, and its value increases by one (0, 1, 2, ... 7) so its position moves from the left to the right. Similarly, parameter "v" indicates the address of each component of a vertical column in each matrix, and its value increases by one as its position moves from the top to the bottom. Namely, parameters "u" and "v" of the DC component are "0", respectively.

In Step 105, it is determined whether the group number of group $C'_{uv}$ is larger than the group number of group $C_{uv}$.

If $C'_{uv} > C_{uv}$, Step 106 selects the maximum coefficient, for example, from the maximum coefficient (MAX. COEF.) column of FIG. 8 as the changed quantized DCT coefficient $r''_{uv}$. Conversely, if $C'_{uv} \leq C_{uv}$, Step 107 selects $r'_{uv}$ as the changed quantized DCT coefficient $r''_{uv}$.

When Step 105 is performed for the first time, parameters "u" and "v" are "0", respectively, initiating the performance of the determination of the group number for the DC component. As shown in FIGS. 7 and 9, the group numbers for both $C_{uv}$ and $C'_{uv}$ are "5". Since $C'_{uv} = C_{uv}$, Step 107 is executed, selecting the optimum quantized DCT coefficient $r'_{uv}$ "20" as the changed quantized DCT coefficient $r''_{uv}$. In other words, when the data length of the differential value of the optimum quantized DCT coefficient $r'_{uv}$ is not longer than that of the differential value of the quantized DCT coefficient $r_{uv}$, the optimum quantized DCT coefficient $r'_{uv}$ is selected. Conversely, when the data length of the differential value (the coefficient value in case of the AC component) of the optimum quantized DCT coefficient $r'_{uv}$ is longer than that of the differential value (the coefficient value in case of the AC component) of the quantized DCT coefficient $r_{uv}$, the maximum coefficient is selected instead of the optimum quantized DCT coefficient $r'_{uv}$. The latter case will be described later.

In Step 108, parameter "u" is incremented by one, and in Step 109, it is determined whether parameter "u" is larger than or equal to "8". When parameter "u" is less than "8", the process returns to Step 105, since the processing for one line in each matrix of the DCT coefficient groups R11 and R12 has not been completed.

From the example, when parameter "u" is "1" and parameter "v" is "0", FIGS. 7 and 9 show that $r'_{uv} = 7$, $r_{uv} = 4$ and $C'_{uv} = C_{uv} = 3$, executing Step 107. Step 107 selects the optimum quantized DCT coefficient $r'_{uv}$ "7" as the changed quantized DCT coefficient $r''_{uv}$. Namely, since the data length of the coefficient value of the optimum quantized DCT coefficient $r'_{uv}$ is not longer than that of the coefficient value of the quantized DCT coefficient $r_{uv}$, the optimum quantized DCT coefficient $r'_{uv}$ is selected as the changed quantized DCT coefficient $r''_{uv}$.

When Step 109 determines that parameter "u" is larger than or equal to "8", parameter "v" is incremented by one in Step 110, and it is determined in Step 111 whether "v" is larger than or equal to "8". When parameter "v" is less than "8", the process has not been completed for all of the lines in each matrix of the DCT coefficient groups R11 and R12, thus parameter "u" is reset to "0" in Step 104, and then, Steps 105 through 109 are executed for the next line.

From the example when parameter "u" is "0" and parameter "v" is "1" FIGS. 7 and 9 show that $r'_{uv} = -8$, $r_{uv} = -7$ and $C'_{uv} > C_{uv}$, executing Step 106. Step 106 select the maximum coefficient $r'_{uv}$ "−7" as the changed quantized DCT coefficient $r''_{uv}$. Namely, since the data length of the coefficient value of the optimum quantized DCT coefficient $r'_{uv}$ is longer than that of the coefficient value of the quantized DCT coefficient $r_{uv}$, among the coefficients (−7, . . ., −4, 4, . . ., 7) in the group to which the quantized DCT coefficient $r_{uv}$ belongs, the coefficient which is the closest (−7) to the coefficient "−8" of the optimum quantized DCT coefficient $r'_{uv}$ is selected as the changed quantized DCT coefficient $r''_{uv}$.

After the above operation is repeatedly performed and all of the coefficient values of one block are set to the changed quantized DCT coefficients $r''_{uv}$, it is determined in Step 111 that the parameter "v" is larger than or equal to "8", and thus, the program stops processing the current block. Note that this program is executed for all of the blocks composing one frame.

The changed quantized DCT coefficients $r''_{uv}$ for one frame obtained by the program shown in FIG. 10 are inputted to the Huffman encoding process circuit 23, and are encoded according to a predetermined algorithm. The image signals (Y', Cb', Cr') obtained by this encoding, that is, the image signals subjected to data compression are recorded to the recording medium M.

As described above, according to the second embodiment, the image signals (Y', Cb', Cr') encoded based on the changed quantized DCT coefficients $r''_{uv}$ and the optimum quantized table R7 are recorded to the recording medium M. Therefore, if the DCT coefficients are obtained by inversely quantizing the image signals (Y', Cb', Cr') the DCT coefficients have values very close to the DCT coefficients R2 inputted to the quantization processing circuit 22. If the pixel data are calculated according to the inverse DCT transformation, pixel data approximately the same as the inputted pixel data (i.e., pixel data of the pixel block R1) are reproduced, and thus the image quality of the reproduced image is improved.

Further, the second embodiment is constructed in such a manner that the data length of each coefficient value of the changed quantized DCT coefficients $r''_{uv}$ is not longer than the data length of each coefficient value of the quantized DCT coefficients $r_{uv}$. Therefore, the length of the data processed in the Huffman encoding process circuit 23 is restricted, and thus, control of circuit 23 is simple.

A third embodiment of the present invention is described below with reference to FIGS. 11 and 12.

FIG. 11 shows data, especially data having values other than "0", among $r_{uv}$, $r'_{uv}$, $C_{uv}$, $C'_{uv}$, and $r''_{uv}$, shown in FIG. 7 as in FIG. 9, and further, shows minimum coefficients in addition to maximum coefficients. The plus and minus symbols on the minimum coefficient are coincident with the plus and minus symbols on $r'_{uv}$.

Figure 12:
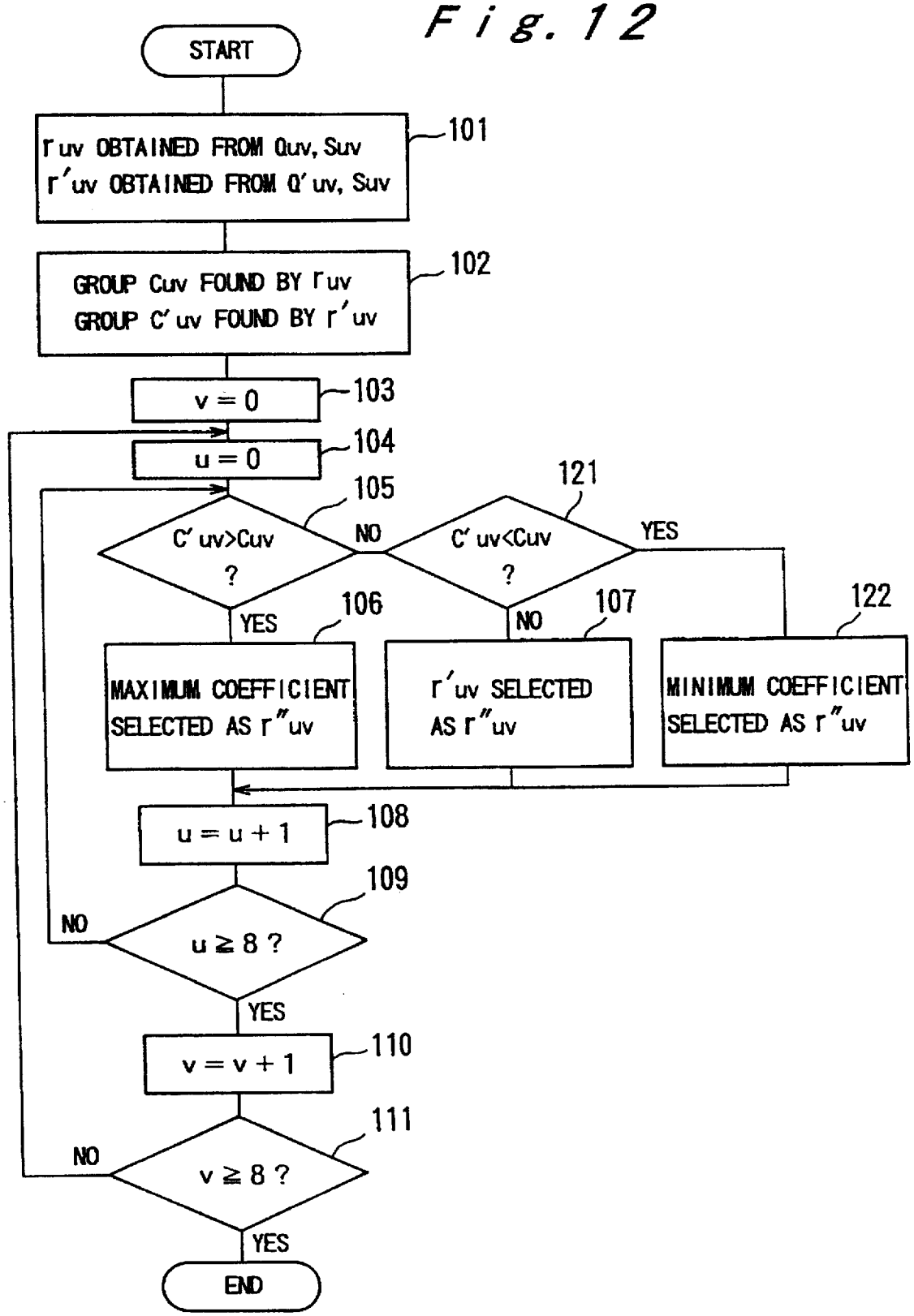
FIG. 12 is a flow chart of a program for obtaining the changed quantized DCT coefficients in the third embodiment.

FIG. 12 shows a flow chart of a program for obtaining the changed quantized coefficients R13 based on the DCT coefficients R4 and R10. In FIG. 12, Steps corresponding to Steps of the flow chart in FIG. 10 are shown using the same reference numbers as FIG. 10, and only the process steps which are different from that of FIG. 10 is described below.

If Step 105 determines that $C'_{uv} > C_{uv}$ is not true, Step 121 determines whether $C'_{uv} < C_{uv}$. When $C'_{uv} < C_{uv}$ is not true, then $C'_{uv} = C_{uv}$ and $r_{uv}$ is selected in Step 107 as the changed quantized DCT coefficient $r''_{uv}$. Conversely, when $C'_{uv} < C_{uv}$, Step 122 selects, the minimum coefficent as the changed quantized DCT coefficient $r''_{uv}$.

When parameter "u" is "1" and parameter "v" is "0", the example shown in FIGS. 7 and 11 show that Step 107. Step 107 selects the optimum quantized DCT coefficient $r'_{uv}$ "7" as the changed quantized DCT coefficient $r''_{uv}$. Namely, when the data length of the coefficient value of the optimum quantized DCT coefficient $r'_{uv}$ is equal to that of the coefficient value of the quantized DCT coefficient $r_{uv}$, the optimum quantized DCT coefficient $r'_{uv}$ is selected as the changed quantized DCT coefficient $r''_{uv}$.

When parameter "u" is "0" and parameter "v" is "3", the example of FIGS. 7 and 11 show that the value of $r'_{uv}=0$, $r_{uv}=1$, and $C_{uv} > C'_{uv}$ ($C'_{uv}=0$, $C_{uv}=1$), thus executing Step 122. Step 122 selects the minimum coefficient, from the minimum coefficient column (MIN.COEF.) of FIG. 8, "−1" as the changed quantized DCT coefficient $r''_{uv}$. As a further example, assume $r'_{uv}=3$ and $r_{uv}=7$ (not shown in FIG. 11). The minimum coefficient "4" is selected as the changed quantized DCT coefficient $r''_{uv}$ by Step 122 since $C'_{uv}=2$ and $C_{uv}=3$. Namely, when the data length of the coefficient value of the optimum quantized DCT coefficient $r'_{uv}$ is shorter than that of the coefficient value of the quantized DCT coefficient $r_{uv}$, among the coefficients (−7, . . ., −4, 4, . . ., 7) in the group to which the quantized DCT coefficient $r_{uv}$ belongs, the coefficient which is the closest (4) to the coefficient "3" of the optimum quantized DCT coefficient $r'_{uv}$ is selected as the changed quantized DCT coefficient $r''_{uv}$.

According to the third embodiment, similarly to the second embodiment, the image quality of the reproduced image is improved. In addition, since the third embodiment is constructed in such a manner that the data length of each coefficient value of the changed quantized DCT coefficients $r''_{uv}$ is always equal to that of each coefficient value of the quantized DCT coefficients $r_{uv}$, the length of data processed in the Huffman encoding process circuit 23 is always constant, and thus control of this circuit 23 is simplified.

Note that, in the above embodiment, the present invention is applied to a device in which an image signal is compressed according to the JPEG algorithm. The present invention, however, can be applied to data compression algorithms other than the JPEG algorithm.

Further, although the present invention is applied to a device in which an image signal is compressed in the above embodiment, the present invention can be applied to a device for compressing data other than image data.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI 5-303560 (filed on Nov. 9, 1993) and Japanese Patent Application No. HEI 5-308727 (filed on Nov. 15, 1993) which are expressly incorporated herein, by reference, in their entirety.

I claim:

1. A device for processing digital data, comprising:
    quantization means for quantizing input data to obtain first quantized data using a first quantization table containing a plurality of first quantization coefficients;
    inverse quantization means for inversely quantizing said first quantized data to obtain inversely quantized data; and
    generating means for generating a second quantization table, based on said input data and said inversely quantized data, containing a plurality of second quantization coefficients which are obtained in such a manner that a second inversely quantized data have values closer to said input data in comparison with said first quantization coefficients.

2. A device according to claim 1, wherein said input data comprise image processing data composed of elements, the number of which is the same as that of said first quantization coefficients.

3. A device according to claim 2, wherein said image processing data comprise DCT coefficients obtained by applying a two-dimensional discrete cosine transformation to pixel data of an original image.

4. A device according to claim 1, wherein said generating means changes said first quantization coefficients to generate said second quantization table in such a manner that a sum of the squares of a the difference between each coefficient of said input data and each respective coefficient of said inversely quantized data has a minimum value.

5. A device according to claim 1, further comprising:

encoding means for encoding said first quantized data to generate encoded data.

6. A device according to claim 5, further comprising:

recording means for recording said encoded data and said second quantization table to a recording medium.

7. A device according to claim 1, wherein, said quantization means quantizes said input data to obtain second quantized data using said second quantization table, said device further comprising:

changing means for changing said second quantized data in such a manner that a length of data obtained by applying a predetermined process to said second quantized data is not longer than a length of data obtained by applying said predetermined process to said first quantized data.

8. A device according to claim 1, wherein said quantization means quantizes said input data to obtain second quantized data using said second quantization table, said device further comprising:

classifying means for classifying a coefficient included in each of said first quantized data and said second quantized data in accordance with a data length of each said coefficient to determine a group to which each said coefficient belongs; and changing means for changing said second quantized data in such a manner that said group to which a coefficient of said second quantized data belongs does not have a data length longer than that of a group to which a corresponding coefficient of said first quantized data belongs.

9. A device according to claim 8, wherein said changing means changes said second quantized data to obtain third quantized data in such a manner that a group to which a coefficient of said third quantized data belongs has the same data length as that of the group to which a corresponding coefficient of said first quantized data belongs.

10. A device according to claim 9, wherein, when the data length of the coefficient of said second quantized data is longer than that of the corresponding coefficient of said first quantized data, said changing means selects a coefficient which has a biggest absolute value among the coefficients included in the group to which the coefficient of said first quantized data belongs, to obtain said third quantized data.

11. A device according to claim 9, wherein, when the data length of the coefficient of said second quantized data is equal to that of the corresponding coefficient of said first quantized data, said changing means does not change the coefficient of said second quantized data.

12. A device according to claim 9, wherein, when the data length of the coefficient of said second quantized data is shorter than that of the corresponding coefficient of said first quantized data, said changing means selects a coefficient which has a smallest absolute value among the coefficients included in the group to which the coefficient of said first quantized data belongs, to obtain said third quantized data.

13. A device according to claim 9, further comprising:

encoding means for encoding said third quantized data to generate encoded data.

14. A device according to claim 13, further comprising:

recording means for recording said encoded data and said second quantization table to a recording medium.

15. A device for processing digital data, comprising:

quantization means for quantizing input data to obtain first quantized data using a first quantization table containing a plurality of first quantization coefficients and for quantizing said input data to obtain second quantized data using a second quantization table containing a plurality of second quantization coefficients having values different than said first quantization coefficients;

each of said coefficients having a data length related to a number of bits in an encoded binary value of each of said coefficients;

classifying means for classifying each said coefficient included in each of said first quantized data and said second quantized data in accordance with said data length of each said coefficient to determine a group to which each said coefficient belongs; and changing means for changing said second quantized data to obtain third quantized data in such a manner that a group to which a coefficient of said third quantized data belongs does not have a data length longer than that of a group to which a corresponding coefficient of said first quantized data belongs.

16. A device according to claim 15, wherein, when the data length of a coefficient of said second quantized data is longer than that of a corresponding coefficient of said first quantized data, said changing means selects a coefficient which has a biggest absolute value among the coefficients included in the group to which the coefficient of said first quantized data belongs, to obtain said third quantized data.

17. A device according to claim 15, wherein, when the data length of a coefficient of said second quantized data is equal to that of a corresponding coefficient of said first quantized data, said changing means does not change the coefficient of said second quantized data.

18. A device according to claim 15, wherein, when the data length of a coefficient of said second quantized data is shorter than that of a corresponding coefficient of said first quantized data, said changing means selects a coefficient which has a smallest absolute value among the coefficients included in the group to which the coefficient of said first quantized data belongs, to obtain said third quantized data.

19. A device according to claim 15, further comprising:

encoding means for encoding said third quantized data to generate encoded data.

20. A device according to claim 19, further comprising:

recording means for recording said encoded data and said second quantization table in a recording medium.

21. A device according to claim 6, wherein said second quantization table is used for reproducing said encoded data recorded in said recording medium.

* * * * *